(12) United States Patent
Schaefer

(10) Patent No.: US 8,770,654 B2
(45) Date of Patent: Jul. 8, 2014

(54) MOTOR VEHICLE WITH WATER BOX COVER

(71) Applicant: GM Global Technology Operations LLC, Detroit, MI (US)

(72) Inventor: Joachim Schaefer, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/744,148

(22) Filed: Jan. 17, 2013

(65) Prior Publication Data

US 2013/0187408 A1    Jul. 25, 2013

(30) Foreign Application Priority Data

Jan. 19, 2012  (DE) .................. 10 2012 001 023

(51) Int. Cl.
*B60R 13/07* (2006.01)

(52) U.S. Cl.
USPC ........................................................ 296/192

(58) Field of Classification Search
CPC  B62D 25/081; B06J 10/0045; B06J 10/0062; B06J 10/0051; B06J 10/0074; B06J 10/0077; B06J 10/02; B06J 10/044; B06J 1/1861; B06J 5/00; B06J 5/0412; B06J 5/10; B06J 7/106; B06J 7/223
USPC ................................................. 296/192, 208
See application file for complete search history.

(56) References Cited

U.S. PATENT DOCUMENTS

| | | |
|---|---|---|
| 6,193,304 B1 | 2/2001 | Takahashi et al. |
| 7,357,212 B2 | 4/2008 | Sasaki et al. |
| 7,669,884 B2 | 3/2010 | Kikuchi et al. |
| 2003/0057660 A1 | 3/2003 | Ortmuller et al. |

FOREIGN PATENT DOCUMENTS

| | | |
|---|---|---|
| DE | 19921871 A1 | 11/1999 |
| DE | 102005040358 A1 | 3/2006 |
| DE | 102007021533 A1 | 12/2007 |
| DE | 102007017427 A1 | 11/2008 |
| EP | 1808322 A1 | 7/2007 |
| FR | 2710009 A1 | 3/1995 |
| GB | 2153754 A | 8/1985 |
| JP | 02175473 A | 7/1990 |
| JP | 2001071938 A | 3/2001 |
| JP | 2007055293 A | 3/2007 |
| WO | 2012043147 A1 | 4/2012 |

OTHER PUBLICATIONS

German Patent Office, German Search Report for Application No. 10 2012 001 023.0 dated Sep. 5, 2012.

*Primary Examiner* — Joseph Pape
*Assistant Examiner* — Dana Ivey
(74) *Attorney, Agent, or Firm* — Ingrassia Fisher & Lorenz, P.C.

(57) ABSTRACT

A motor vehicle includes a front hood, a front window supported on a lower edge by a window support, and a water box below a gap between the front window and the front hood. A water box cover is fastened to the window support.

11 Claims, 3 Drawing Sheets

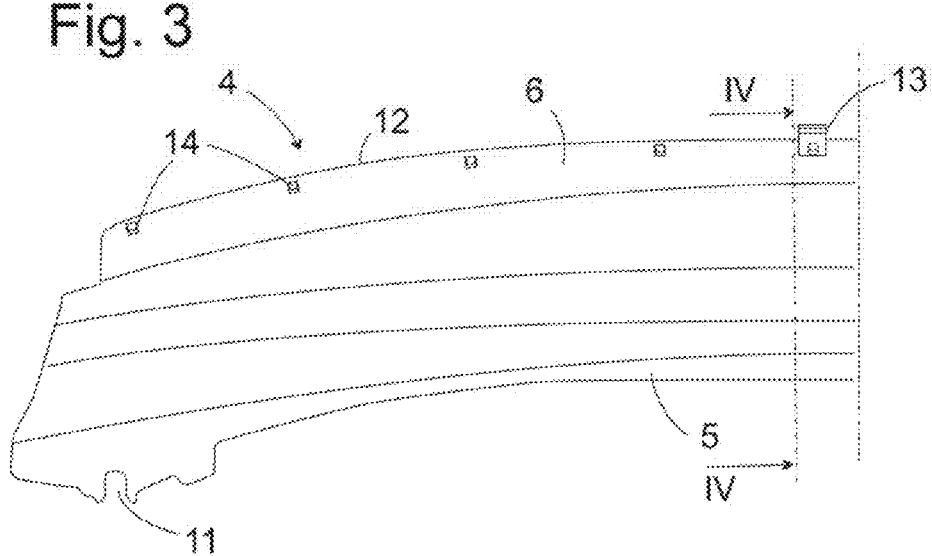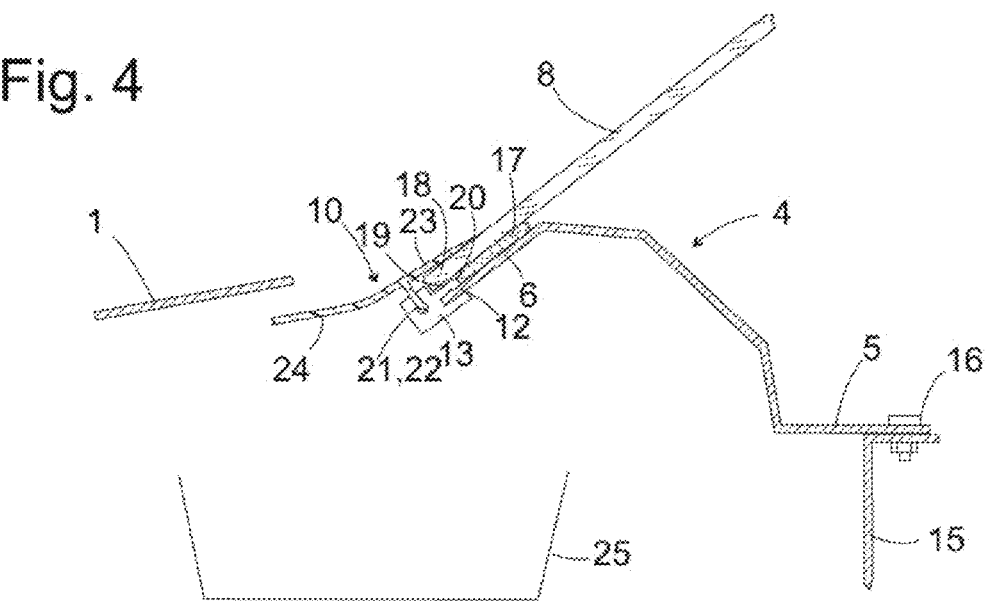

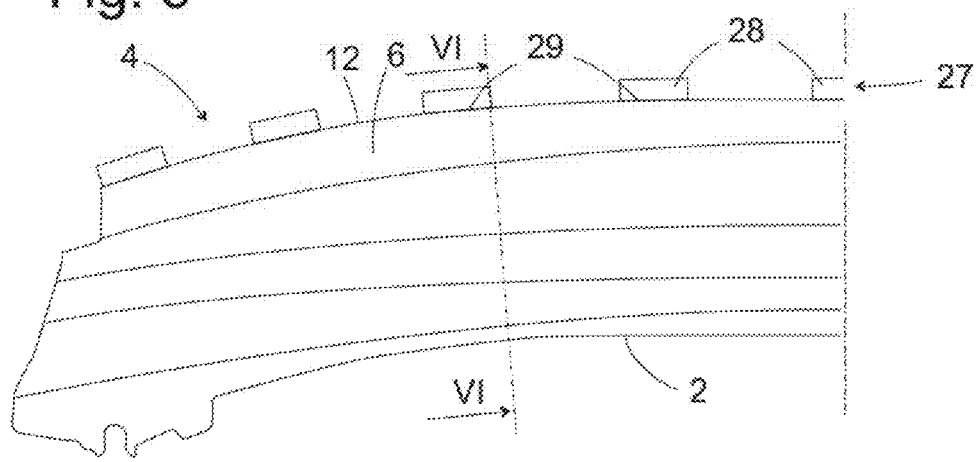
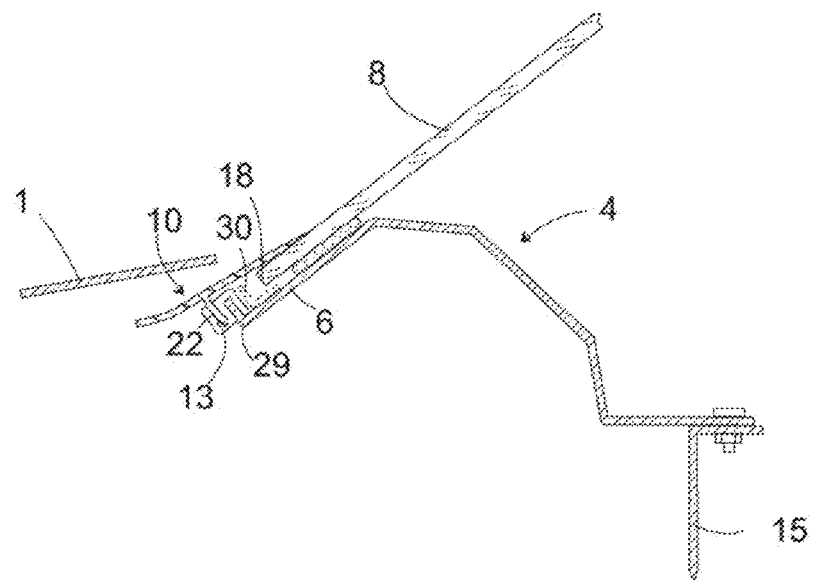
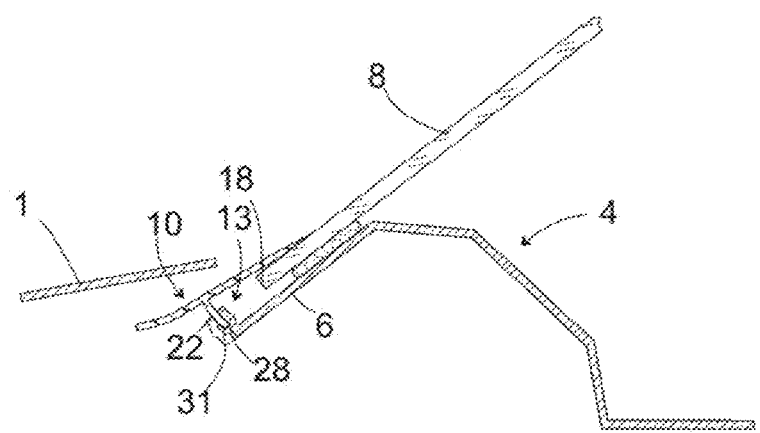

MOTOR VEHICLE WITH WATER BOX COVER

CROSS-REFERENCE TO RELATED APPLICATION

This application claims priority to German Patent Application No. 102012001023.0, filed Jan. 19, 2012, which is incorporated herein by reference in its entirety.

TECHNICAL FIELD

The technical field relates to a motor vehicle with a water box cover.

BACKGROUND

A water box is usually arranged on a motor vehicle on a lower edge of its front window and serves for accommodating various components such as for example windscreen wiper motors and linkages. A water box cover is usually provided in order to keep water and dirt draining from the front window away from the water box.

From DE 10 2007 017 427 A1 a motor vehicle having a front window supported on its lower edge by a window support, a front hood, a water box arranged below a gap between the front window and the front hood, and a water box cover is known. An edge of the water box cover is designed as a U-profile which engages about the lower edge of the front window.

At least one object herein is to optimize this conventional construction with respect to the pedestrian protection. In addition, other objects, desirable features and characteristics will become apparent from the subsequent summary and detailed description, and the appended claims, taken in conjunction with the accompanying drawings and this background.

SUMMARY

In accordance with an exemplary embodiment, a water box cover is fastened to a window support instead of on a front window. For in tests that have led to the various embodiments herein, it was determined that the U-profile conventionally acting on the lower edge of the front window impedes both the bursting of the front window during the impact of an impactor as well as a subsequent yielding of the front window and the window support. In that the fastening of the water box cover is relocated from the front window to the window support one succeeds to significantly reduce the values of the HIC (head injury criterion) during an impact on the front window.

When a flange of the window support contacting the front window is indirectly or directly connected in a manner know per se via an upper rear edge with a load-bearing body element such as, for example, a front wall extending between engine compartment and passenger cell, the water box cover can be practically fastened to a front lower edge of the flange.

In one embodiment, a clamping element of the water box cover acts on the front lower edge of the flange.

This clamping element can engage into a gap between an inside of the front window and the flange. The front lower edge of the flange however can also be extended beyond the lower edge of the front window, for example, towards the front in order to make possible through the front window an attachment of the clamping element that is substantially unimpeded.

The attachment of the clamping element can be facilitated for example in that on the front lower edge of the flange an edge zone rising towards the front is formed, onto which the clamping element can be joined.

In order to prevent that a bend between the flange sloping towards the front and the edge zone rising towards the front impairs the resilience of the window support during an impact, the edge zone can be practically divided in a vehicle transverse direction.

In another embodiment, a plurality of the clamping elements is arranged distributed along the front lower edge. The use of discrete clamping elements instead of a continuous profile likewise facilitates the yielding of the window support during an impact.

However, an individual clamping element can also be provided, which continuously extends over a predominant part of the lower edge of the front window. Such a continuous clamping element can contribute to the sealing of the water box with respect to precipitation water.

The continuous clamping element can be produced from a material that is more resilient than that of the window support so as not to stiffen the latter unnecessarily.

In one embodiment, such a continuous clamping element is embodied as an extruded profile.

In another embodiment, the front lower edge of the window support can be provided with a plurality of discrete notches, on which the continuous clamping element or in each case one of the plurality of discrete clamping elements can positively act. The presence of the notches also accelerates the installation of the discrete clamping elements in that the notches in each case mark the intended installation positions of the clamping elements.

In a further embodiment, the clamping element is a component that is separate from the water box cover, and the water box cover and the clamping element comprise complementary fastening contours for fastening to each other, for example, plug contours, so that after the installation of the clamping elements on the window support the water box cover can be fastened to the clamping elements.

In order to facilitate the installation of the water box cover, in an embodiment, the plug contours of the clamping elements are aligned so that they make possible a plug-in movement of the water box cover in the direction of a surface normal of the front window.

The water box cover can comprise a web covering the lower edge of the front window in order to conceal clamping elements located below.

BRIEF DESCRIPTION OF THE DRAWINGS

The various embodiments will hereinafter be described in conjunction with the following drawing figures, wherein like numerals denote like elements, and wherein:

FIG. 3 is a partial top view of the window support of the vehicle of FIG. 1 according to an exemplary embodiment;

FIG. 4 is a schematic cross-sectional view through the body components shown in FIGS. 1 and 2 along the plane IV-IV from FIG. 3;

FIG. 5 is a partial top view of a window support analogous to FIG. 3 according to an exemplary embodiment;

FIG. 6 is a cross-sectional view through the body components shown in FIG. 1 and FIG. 2 according to another exemplary embodiment along axis VI-VI of FIG. 5; and FIG. 7 is a cross-sectional view through the body components shown in FIG. 1 and FIG. 2 according to a further exemplary embodiment analogous to FIG. 4.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
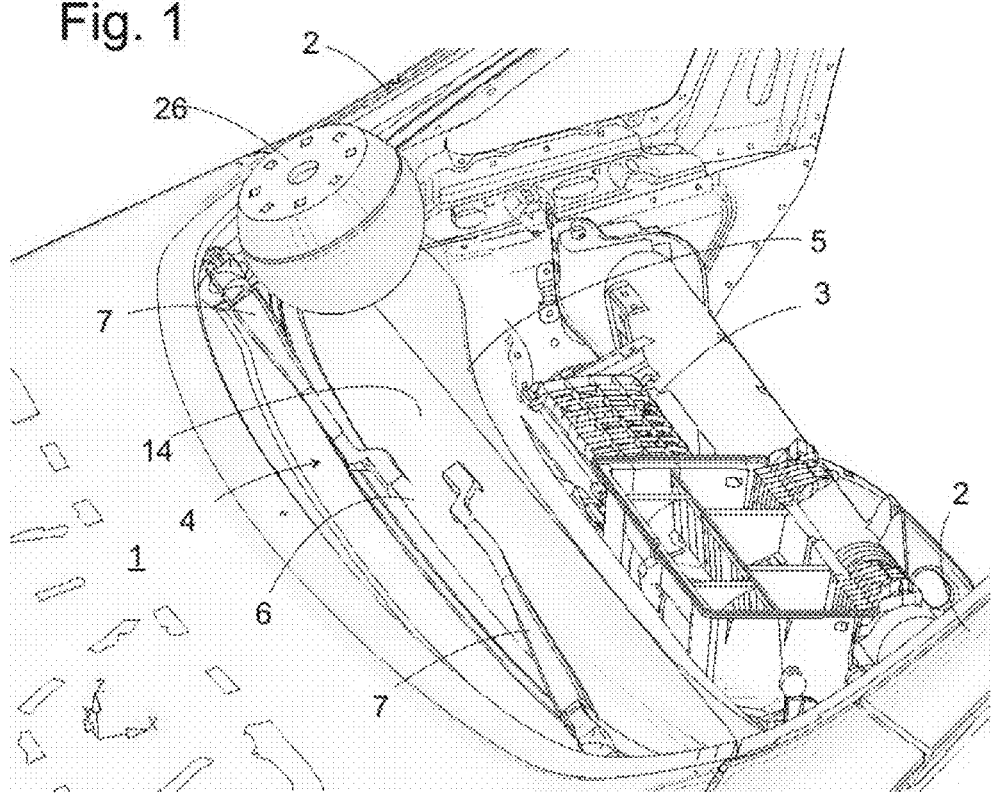
FIG. 1 is a perspective view of a part of the body of a motor vehicle according to an exemplary embodiment and of an impactor simulating the impact of the head of a pedestrian on the body.

FIG. 1 shows a perspective view of a part of a motor vehicle body to which the various embodiments of the water box contemplated herein can be applied. Visible is a rear region of a front hood 1 and a window opening following thereon which with the finished motor vehicle receives a front window, flanked by A-pillars 2. A dashboard covering extending under the front window with the finished vehicle has been omitted in FIG. 1, so that installations 3 of the dashboard located below and a window support 4 are visible, which with the finished vehicle are concealed under the dashboard covering. The shape of the window support 4 is plate-like in the sense that it can be formed through three dimensional forming of a cutting of flat material, in particular through forming from a steel plate. It would also be conceivable to use a window support of plastic, for example, of fiber-reinforced plastic, which for example can be produced by cuttings of fiber material onto a die and pressing the cuttings together under the effect of heat.

The window support 4 substantially has the shape of a channel installed overhead with a concave side facing downwards, of which a front side wall obliquely sloping downwards to the front forms a support flange 6 for the front window. From a rear side wall of the channel, a horizontally oriented rear flange 5 is angled-off, which supports itself on a front wall that is not visible in FIG. 1, extending between an engine compartment and a passenger cell of the motor vehicle.

Below the support flange 6 and the rear edge of the front hood 1 there extends a water box in the known manner which is not visible in FIG. 1, in which motors of windshield wipers 7 are accommodated.

Figure 2:
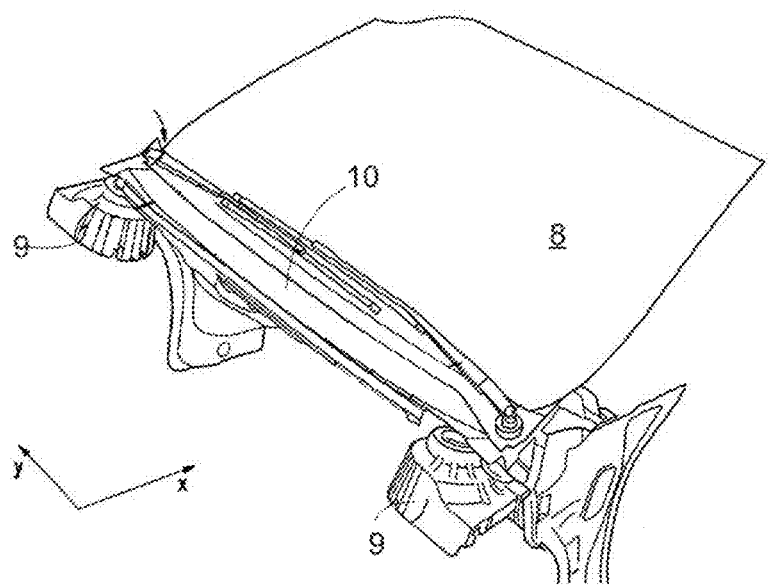
FIG. 2 missing parts for completing the body of FIG. 1 from a similar perspective.

In a perspective similar to those of FIG. 1, FIG. 2 shows the front window to be mounted in the window opening, here designated 8. Between a lower edge of the front window 8 and spring strut domes 9 of front wheels of the motor vehicle, there extends a free space over the entire width of the front window 8 in FIG. 2, which is provided in order to receive the water box. A water box cover 10 covers the lower edge of the front window 8 and extends to the front as far as under the front hood 1 which is not shown in FIG. 1.

FIG. 3 shows the left half of the window support 4 in a top view, in accordance with an exemplary embodiment. Following the curve of the front wall, the horizontal rear flange 5 is tightly curved towards the front. On its rear edge, recesses 11 are visible, in which screws for fastening to the front wall can be placed. Matching the curve of the front window 8, the support flange 6 is likewise curved towards the front. A front lower edge 12 of the support flange 6 approximately closes off flush with the lower edge of the front window 8.

Along this edge 12, a plurality of fastening clips 13 are distributed, of which only one is shown in schematic top view. In one embodiment, the fastening clips 13 can be held on the support flange 6 by frictional connection; in an alternative embodiment, a plurality of notches 14, for example in the form of small break-throughs or recesses, are distributed on the support flange 6 adjacent to the edge 12, which make possible a positive engagement of the fastening clips 13 and predetermine their installation position along the edge 12.

FIG. 4 shows a schematic cross section through the window support 4 and its surroundings around the plane IV-IV of FIG. 3. Clearly evident is the channel-like shape of the window support 4 with the rear flange horizontally angled-off towards the back and fastened to the front wall designated 15 here by means of screws 16, in accordance with an embodiment.

The support flange 6 carries the lower edge region of the front window 8 via an elastic sealing band 17, in an embodiment. The sealing band 17 leaves the lower edge 12 of the support flange 6 clear, so that between it and the lower edge 18 of the front window 8 an intermediate space 19 stays clear, in which a leg 20 each of the fastening clips 13 engages.

The fastening clips 13 each comprise a groove 21 that is open in the direction of the surface normal of the front window 8, in which a spring 22 of the water box cover 10 is fixed. A leg 23 of the water box cover 10 standing away from the spring 22 obliquely towards the top and towards the back tightly hugs the outside of the front window 8. A leg 24 extending in the opposite direction extends over the schematically represented water box 25 as far as to below the rear edge region of the front hood 1.

When a head impactor 26 as shown in FIG. 1 impacts the lower edge of the front window 8, the fastening clips 13 discretely distributed along the lower edge 12 of the window support 4 do not contribute to the deformation resistance of the body, and the water box cover 10, which can also be produced from a thin-walled material, at most presents a minor resistance to a deformation. For this reason, the deceleration acting on the impactor 26 after the bursting of the front window 8 is substantially determined by the window support 4.

By means of FIG. 4 it is easily imaginable that the plurality of clamping elements 13 distributed along the edge 12 can be replaced through a continuous clamping element 13 or clamping profile with identical cross section. Such a clamping profile can be cost-effectively produced from plastic through extrusion, wherein material and wall thickness can be selected so that the clamping profile does not stiffen the edge 12 to speak of and thus does not impede the bursting of the front window 8 during an impact. The V-like cross section of the clamping profile with concavity open towards the top allows collecting precipitation water that would seep through between the leg 23 and the front window 8 and drip off the lower edge 18, discharging it in lateral direction so that it does not reach the water box 25.

FIG. 5 shows a top view of a window support 4 according to another exemplary embodiment, and FIG. 6 shows the same window support 4 and its surroundings in a section along the plane VI-VI from FIG. 5. The support flange 6 of the window support 4 in this case is extended beyond the lower edge 18 of the front window and provided with an edge zone 27 that rises in vehicle longitudinal direction towards the front. The edge zone 27 can be designed as a strip that continuously extends over the entire width of the window support 4; in the representation of FIG. 5, the edge zone 27 consists of a plurality of straps 28, which among themselves are only unitarily connected via the support flange 6 extending behind. Separating the edge zone 27 into individual straps 28 results in that a bend 29 on the boundary between support flange 6 and edge zone 27 does not decisively contribute to the stiffness of the window support 4.

The edge zone 27 rising towards the front facilitates the fitting of fastening clips 13, which with this configuration are designed in cross section approximately S-shaped, with grooves oriented opposite for fitting onto the edge zone 27 or for receiving the spring 22 of the water box cover 10.

Here, too, according to a modification the discrete clamping elements 13 can be replaced through an individual clamping element 13 in the form of an extruded profile continuously extending below the edge 18. Other than with the modification explained with respect to FIG. 4, the extruded profile in this case cannot serve as barrier against seepage water, which penetrates between the leg 23 and the front window 8. In order to discharge this seepage water, a flexible V-profile can be additionally provided, which extends along the edge 18 bridging the intermediate spaces between the straps 28 and has a leg glued to the support flange 6 in a water-tight manner.

FIG. 7 shows a further embodiment in a section that is analogous to FIGS. 4 and 6. While with the window support 4 of the second configuration, as shown in FIG. 5, the straps 28 are separated through wide intermediate spaces, these intermediate spaces according to this configuration are filled out by second straps 31. These second straps are bent L-shaped so that together with the straps 28 they form alternating walls of a groove in vehicle transverse direction, into which the spring 22 of the water box cover 10 is clamped. In other words, the straps 28, 31 in this case function as a clamping element 13 for fixing the water box cover 10, which—in contrast with the previously considered configurations—is embodied unitarily with the window support 4 and therefore no longer requires any assembly step.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle comprising:
   a front hood;
   a front window supported on a lower edge by a window support, the window support including a flange connected via an upper rear edge to a load-bearing body element;
   a gap defined between the front window and the front hood;
   a water box positioned below the gap between the front window and the front hood; and
   a water box cover fastened to a front lower edge of the flange of the window support, the water box cover including a clamping element coupled to the front lower edge of the flange,
   wherein the clamping element is separate from the water box cover and the water box cover and the clamping element each have a plug contour that is complementary to the other.

2. The motor vehicle according to claim 1, wherein the clamping element engages in a gap between an inside of the front window and the flange.

3. The motor vehicle according to claim 1, wherein the front lower edge of the flange extends beyond the lower edge of the front window.

4. The motor vehicle according to claim 3, wherein the front lower edge of the flange includes an edge zone.

5. The motor vehicle according to claim 4, wherein a clamping element is fitted onto the edge zone.

6. The motor vehicle according to claim 4, wherein the edge zone includes a plurality of straps.

7. The motor vehicle according to claim 1, wherein a plurality of clamping elements are distributed along the front lower edge of the flange.

8. The motor vehicle according to claim 1, wherein the clamping element continuously extends over a predominant part of the lower edge of the front window.

9. The motor vehicle according to claim 8, wherein the clamping element is an extruded profile.

10. The motor vehicle according to claim 1, wherein the front lower edge of the flange comprises a notch configured for a positively-connected application of the clamping element.

11. The motor vehicle according to claim 1, wherein the plug contour of the clamping element is configured for a plug-in movement of the water box cover in a direction of a surface normal of the front window.

\* \* \* \* \*